US012380236B2

(12) United States Patent
Amico

(10) Patent No.: US 12,380,236 B2
(45) Date of Patent: Aug. 5, 2025

(54) DATA PRIVACY AND SECURITY MANAGEMENT SYSTEM

(71) Applicant: PRIVACY4CARS, Inc., Kennesaw, GA (US)

(72) Inventor: Andrea Amico, Marietta, GA (US)

(73) Assignee: Privacy4Cars, Inc., Kennesaw, GA (US)

( * ) Notice: Subject to any disclaimer, the term of this patent is extended or adjusted under 35 U.S.C. 154(b) by 333 days.

(21) Appl. No.: 17/566,417

(22) Filed: Dec. 30, 2021

(65) Prior Publication Data

US 2023/0214521 A1 Jul. 6, 2023

(51) Int. Cl.
*H04L 29/06* (2006.01)
*G06F 21/62* (2013.01)

(52) U.S. Cl.
CPC ................ *G06F 21/6245* (2013.01)

(58) Field of Classification Search
CPC ...... G06F 21/6245; G06F 3/01; G06F 9/4451; G06F 11/3438; G06F 16/9035; G06F 17/30342; G06F 2221/031; G06F 16/24564; G06F 17/30507; G06F 21/62; G06F 19/32; G06F 19/322; G06F 21/6254; G06F 21/6263; G06F 8/43; G06N 5/025; G06K 9/2081; G07C 2209/12; G06Q 10/0635; G06Q 20/363; G06Q 20/4012; G06Q 20/4016; G06Q 20/405; G06Q 30/0269; G06Q 50/265; G02B 27/0093; G03G 15/5091; G05B 2219/24167; G05B 2219/32347; G05B 2219/31461; H04L 29/08819; H04L 67/2852; H04L 67/5682; H04L 61/2557; H04W 12/00; H04W 12/02; H04W 12/00505; H04W 12/67; H04W 4/203; H04M 1/575; H04M 2203/6009;
(Continued)

(56) References Cited

U.S. PATENT DOCUMENTS 9,609,025 B1 3/2017 Betzler
10,747,898 B2 8/2020 Cai et al.
(Continued)

FOREIGN PATENT DOCUMENTS

WO WO2021/026411 2/2021

OTHER PUBLICATIONS

International Search Report for PCT/US2022/080783, issued Mar. 8, 2023.

*Primary Examiner* — Joseph P Hirl
*Assistant Examiner* — Leynna Truvan
(74) *Attorney, Agent, or Firm* — King & Spalding

(57) ABSTRACT

A data privacy and security management system for a vehicle. A privacy server is configured to receive contextual data associated with a vehicle, an in-vehicle module of the vehicle, or a user of the vehicle. The privacy server receives privacy preference information that is representative of user-specific permission settings that define preferences of the user regarding handling of personal data of the user. Privacy action rules can be generated based at least in part on the privacy preference information or the contextual data. The privacy server can determine privacy risk events. For each privacy risk event, the privacy risk server can execute privacy actions, for example, context-based privacy actions, based at least in part on the privacy action rules.

44 Claims, 7 Drawing Sheets

(58) Field of Classification Search
CPC ......... H04N 21/41422; H04N 21/4182; H04N 2013/40; H04N 21/475; H04N 1/00071; H04N 1/00763; H04N 1/00854; H04N 21/83555; H04Q 3/005; B06L 2200/24; B60K 2370/563; G10H 2240/105; G08B 13/19686; G07B 5/08; G08G 1/096708

See application file for complete search history.

(56) References Cited

U.S. PATENT DOCUMENTS

| | | |
|---|---|---|
| 10,824,758 B2 | 11/2020 | Hankeln et al. |
| 10,915,638 B2 | 2/2021 | Czaplewski et al. |
| 10,956,586 B2 | 3/2021 | Sadeh et al. |
| 11,113,415 B1 | 9/2021 | Amico |
| 11,157,648 B1 | 10/2021 | Amico |
| 11,256,827 B2 | 2/2022 | Amico |
| 2004/0025053 A1 | 2/2004 | Hayward |
| 2004/0166812 A1 | 8/2004 | Lumelsky |
| 2005/0196016 A1 | 9/2005 | Sato |
| 2007/0124046 A1 | 5/2007 | Ayoub |
| 2010/0211770 A1 | 8/2010 | Alrabady |
| 2010/0291880 A1 | 11/2010 | Feldstein |
| 2013/0017816 A1 | 1/2013 | Taity |
| 2013/0060820 A1 | 3/2013 | Bulusu |
| 2014/0101784 A1 | 4/2014 | Shukla |
| 2014/0134947 A1 | 5/2014 | Stouder-Studenmund |
| 2014/0240089 A1 | 8/2014 | Chang |
| 2015/0039738 A1 | 2/2015 | Subramani |
| 2015/0317484 A1 | 11/2015 | Bowden |
| 2016/0034590 A1 | 2/2016 | Endras |
| 2016/0034712 A1 | 2/2016 | Patton et al. |
| 2016/0057790 A1 | 2/2016 | Sim |
| 2016/0059864 A1 | 3/2016 | Feit |
| 2016/0128016 A1 | 5/2016 | Avary |
| 2016/0253348 A1 | 9/2016 | Mauti, Jr. |
| 2017/0046533 A1 | 2/2017 | Retter |
| 2017/0132157 A1 | 5/2017 | Makke |
| 2019/0274018 A1 | 9/2019 | Mosenia et al. |
| 2020/0098049 A1 | 3/2020 | Jack |
| 2020/0169564 A1 | 5/2020 | Tanriover et al. |
| 2020/0285761 A1 | 9/2020 | Buck et al. |
| 2020/0334928 A1 | 10/2020 | Bourke et al. |
| 2021/0182402 A1* | 6/2021 | Balu .................. G06F 21/577 |
| 2021/0303705 A1 | 9/2021 | Serdar et al. |
| 2022/0198054 A1* | 6/2022 | Picos ................. G06F 21/6245 |

* cited by examiner

DATA PRIVACY AND SECURITY MANAGEMENT SYSTEM

TECHNICAL FIELD

Embodiments of the present disclosure relate to communicatively connected devices, and particularly to a data privacy and security management system for connected vehicles.

BACKGROUND

Over the past two decades, the automotive industry has witnessed huge advancement in connected vehicle technology to enhance the in-vehicle experience of a user. Internet of Things (IoT) has been the main driver of such advancements which allows various in-vehicle systems to be connected to each other and with external devices/infrastructure to make vehicles smarter, more intelligent, and facilitating safe, efficient and comfortable driving. For example, modern connected vehicles may include Advanced Driver-Assistance Systems (ADAS), in-vehicle infotainment systems, navigation & telematics solutions, predictive maintenance solutions, Vehicle-to-Vehicle (V2V) applications, Vehicle to Infrastructure (V2I) applications, and Vehicle to Everything (V2X) communication applications, etc. While such advancements provide safety, convenience, and other important benefits that enhance the in-vehicle experience of the user; little is being done to protect the enormous amount of data that is either generated, used, or shared to provide the enhanced in-vehicle experience. Such data is confidential and/or personal to a user of the vehicle; and users today are increasingly concerned with privacy of their data. Users want to have control over, protect, and maintain privacy of such personal data to avoid privacy threats such as identity theft. Further, regulatory bodies for personal data protection of vehicle users exist today, and one of the key requirements set forth by such regulatory bodies is to notify and obtain consent from a vehicle user before the personal data of the vehicle user is processed. However, it is problematic for existing vehicles to meet said requirements. Better solutions for data privacy and security in vehicles are needed.

This background information is provided to reveal information believed to be of possible relevance to the present disclosure. No admission is necessarily intended, nor should be construed, that any of the preceding information constitutes prior art against the present disclosure.

BRIEF DESCRIPTION OF FIGURES

The foregoing and other features and aspects of the present disclosure are best understood with reference to the following description of certain example embodiments, when read in conjunction with the accompanying drawings, wherein.

Figure 1:
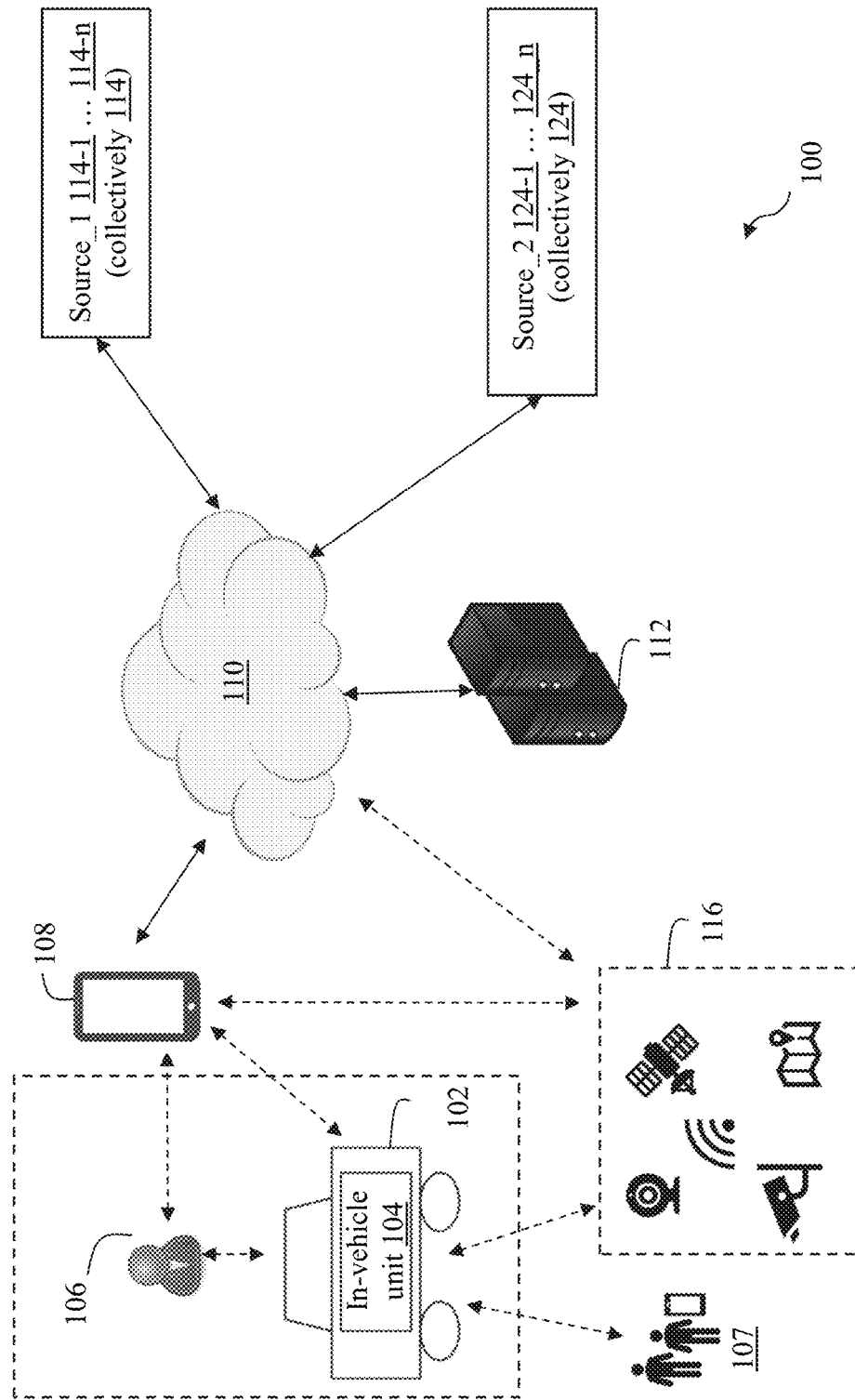
FIG. 1 illustrates an example operating environment of a data privacy and security management system, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

DETAILED DESCRIPTION

Regulatory bodies for personal data protection of vehicle users exist today, and one of the key requirements set forth by such regulatory bodies is to notify and obtain consent from a vehicle user before the personal data of the vehicle user is processed. However, existing vehicles are unable to meet said requirement for various reasons. One of the reasons is that existing vehicles do not have the capability of providing such notifications and obtaining consent from the vehicle user. For example, existing vehicle may not have interactive displays or the ability to have interactive displays or firmware updates that may be needed to deliver notifications and receive consent. Another reason is that even if existing vehicles had the capability to deliver notifications and receive consent, the user interfaces in existing vehicles may not be able to provide such notifications and obtain consent from the vehicle user in a manner that does not compromise the safety of the user. For example, user interfaces of existing vehicles may not be capable of providing notifications and receiving consent in a manner that does not distract the user (e.g., driver) as the vehicle is being operated (e.g., being driven). Each vehicle manufacturer may design a user interface or a solution that allows such operations in safe manner, but such solutions may be ad-hoc and specific to each vehicle. It becomes cumbersome to a user to learn and understand how the notification and consent solution works for each vehicle, e.g., each time a user changes the vehicle. Further, considering the increasingly diverse and widespread interactions of the different systems in the connected vehicles where personal data of the vehicle user is used, the vehicle user may have an unwieldy number of notifications and consents to handle.

Traditional solutions for data privacy and security management such as a 'do not track' option may exist in Internet browsers where a user sets a preference once and notifications may be automatically sent to each website visited through the browser to not track or process the user's personal data. However, such solutions are not applicable in and not readily transferrable to connected vehicles because of the unique challenges associated with connected vehicles, some of which are described above. For example, a vehicle user driving the vehicle should not be distracted with the notification and consent delivery. Further, with an Internet browser on the user's personal computer, the user may have a one to one interaction relation. That is, on a user's personal computer, mostly only the user may interact with the Internet browser. However, in vehicles, multiple people may use one vehicle, e.g., multiple family members may use the same vehicle, user may drive a rental vehicle which may be used by different renters, etc. Furthermore, a vehicle may be driven between and across different geographic regions (e.g., across states, countries, etc.) where the privacy laws and regulations may change. Additionally, connected vehicle may interact with numerous infrastructures (e.g., license plate readers, toll booth transponders—private or government operated, etc.) that may require access to personal data of the users, and each infrastructure may have different privacy policies on how they handle personal data of a user. Also, in many cases, users other than the ones that operating the vehicle (e.g., vehicle passengers, people external to the vehicle, etc.) may need to be notified of personal data access since modern connected vehicles may have sensors that collect data of users other than the one operating the vehicle. The dynamic nature of the various factors associated with connected vehicles described above demonstrates that "traditional" data privacy and security management solutions (e.g. a written disclosure in a contract or a website, a warning sticker, etc.) do not meet the data privacy and security needs in connected vehicles.

The present disclosure describes a method, non-transitory computer readable medium, and/or system that provides a technical solution rooted in computer technology—computer based analysis, artificial intelligence, etc.—to address one or more technical problems of data privacy and security risks in communicatively connected devices, such as connected vehicles. Such technical problems include, but are not limited to, inability of existing technology to: (a) provide data privacy and security is a manner that does not compromise the safety of the vehicle user, (b) account for factors that dynamically change in connected vehicles (e.g., move across different geographic regions, interact with variety of infrastructure, have different users, etc.), (c) reduce the number of notifications and requests sent to the vehicle user, and (d) provide notifications that are meaningful to the context of the user in a manner that is easy to read or hear and understand.

The method, non-transitory computer readable medium, and system of the present disclosure is configured to provide practical applications such as, but not limited to, helping users safely manage data privacy and security in connected vehicles, reduce user burden and increase the accuracy of privacy preferences by providing notifications that are contextualized based at least in part on a number of factors that dynamically change, and providing a platform for users of connected vehicles to better control their personal data when using a connected vehicle. Even though the present disclosure describes data privacy and security management in connected vehicles, one of skill in the art can understand and appreciate that the technology can be extended to various other fields and environments (e.g., configuring privacy settings in Internet of Things (IoT) environments, social networking sites, etc.).

In the following paragraphs, a data privacy and security management system, method, and non-transitory computer readable medium (hereinafter 'system') will be described in further detail by way of examples with reference to the attached drawings. In the description, well known components, methods, and/or processing techniques are omitted or are briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s).

In one example, a system of the present disclosure includes a user computing device associated with a user operating a vehicle (e.g., connected vehicle), where the vehicle, an in-vehicle module of the vehicle, or an external infrastructure with which the vehicle or any modules thereof interacts is capable of collecting, storing, and/or sharing personal information of the user. The user computing device may have a privacy manager. Further, the system includes a privacy server. The privacy manager of the user computing device and the privacy server operate in concert to manage privacy actions when the personal data of the user is at risk, e.g., when the personal data of the user is handled by anyone other than the user in the course of the operation of the vehicle. The privacy manager is configured to provide permission setting options to the user that allows the user to configure the permission settings as desired by the user or select from a preset permission configuration. The permission settings represent if and how the user wants the user's personal data of the user to be handled. The privacy manager receives privacy preference information that is representative of the permission settings configured or selected by the user, e.g., user-specific permission settings. Further, the user computing device may collect contextual data associated with the user and the vehicle. The privacy preference information and the contextual data is transmitted to the privacy server. The privacy server applies a filter on the privacy preference information to generate privacy action rules that determine how the privacy manager and/or the privacy server manages the privacy actions. The filter is applied based at least in part on the contextual data. In some examples, the privacy server may use the contextual data to provide context based permission setting options to the user. The privacy server also uses the contextual data to determine all the privacy risk events associated with the user's personal data as the user operates the vehicle. Then, in response to each privacy risk event, the privacy server executes one or more context based privacy actions based at least in part on the privacy action rules. The permission settings and corresponding privacy preference information, the privacy action rules, and/or the context based privacy actions may be updated (or may change) regularly based at least in part on contextual data, e.g., as the contextual data changes.

Before discussing the example embodiments directed to the vehicle privacy system, it may assist the reader to understand the various terms used herein by way of a general description of the terms in the following paragraphs.

The term "in-vehicle module" as described herein may generally refer to any hardware device and/or software module (including services) that handles personal data of users and that is integrated with, embedded in, attached to, or provided in a vehicle. The user may include any individual operating the vehicle, individuals in the vehicle that are not operating the vehicle (e.g., passengers), and/or individuals outside of the vehicle whose personal data is handled by the vehicle, the in-vehicle modules associated with the vehicle, external infrastructure with which the vehicle interacts, and/or entities associated therewith, etc. The entities associated with the vehicle and/or the in-vehicle module associated with the vehicle may include, but are not limited to, original equipment manufacturers, third parties partnered with OEM (Sirius XM), aftermarket service providers, etc. The in-vehicle modules may include modules or devices that are included in the vehicle from the factory (e.g., OEM units), and/or aftermarket modules or devices attached to the vehicle. Examples of in-vehicle modules of a vehicle may include, but is not limited to, infotainment units, navigational units, Bluetooth units, garage door opener units, driver safety units, safe driving assistance units, insurance telematics units, anti-theft units, vehicle mounted toll-booth transponders, services (e.g., satellite radio services safety services like OnStar, eCall, usage based insurance services, etc.).

The term "handle" or "handling" as used herein in association with the personal data of the user may generally refer to any appropriate interaction with the personal data of the user in a way that may affect the privacy of the personal data. Examples of handling personal data may include, but are not limited to, accessing, receiving, collecting, retaining, sharing, transmitting, using, selling, controlling, etc.

The term "personal data handling approaches" may generally refer to any appropriate information that discloses/defines procedures, practices (including type of data handled), or rules by which any appropriate vehicle, in-vehicle units, external infrastructure with which the vehicle/in-vehicle unit interacts, and/or entities associated therewith handle personal data of the user. Said information may include, but is not limited to, a privacy policy, Terms of Services (ToS), other documented privacy practices, etc. For example, if the vehicle associated with the user is a Mazda Miata; the personal data handling approaches associated with Mazda Miata may refer to and include, but are not limited to, the privacy policy of Mazda Motors in general, the privacy policy of Mazda Motors specific to Miata model, the privacy policy of Bose infotainment system in the Mazda Miata, privacy policy associated with Sirius XM service provider, privacy policy associated with Progressive insurance if a Progressive telematics device is installed or if Progressive insurance covers the Mazda Miata vehicle associated with the user, privacy policy of the dealership/agency from where the vehicle was purchased or rented (if rental vehicle), privacy policy of traffic camera that records video of vehicle at a traffic light, etc. In one or more examples, the vehicle, in-vehicle units, and the external infrastructure may operate as nodes of an IoT (Internet of Things) network where the nodes are interrelated computing devices, mechanical and digital machines, objects, etc., that are provided with unique identifiers (UIDs) and the ability to transfer data (e.g., personal data) over a network with or without requiring human-to-human or human-to-computer interaction.

The term 'personal data' as used herein may generally refer to any information associated with a user that the user does not want an unauthorized party to handle, and/or data that connects back to and uniquely identifies a user. For example, the personal data may include the home address, business address of the user, a contact list of individual names, addresses, phone numbers associated with the user, passwords of the user, image or video of the user or any portion of the user, user's vehicle information (license plate number, etc.), image or video of passengers in user's vehicle, gender, sexual orientation of the user, etc. Personal data may further include navigational data, such as locations that the user drives to and from (e.g., a home or business or other points of interest), driver habits, etc. Personal data may also include financial information, such as a bank account number or credit card number, corresponding to the user of the vehicle.

The term 'contextual data' as used herein may generally refer to any information that defines the user, vehicle, in-vehicle modules associated with the vehicle, and/or surrounding environment associated therewith that affects personal data of users. Such information may include, but is not limited to, details related to the user (age, gender, likes, dislikes, citizenship, married or not married, etc.), vehicle and/or in-vehicle unit (make, model, trim, manufacturers, personal vs rental vs lease, etc.), location of vehicle (geofence, work vs home, geolocation, etc.), details related to devices/infrastructure with which the vehicle and/or in-vehicle unit interacts (e.g., smart infrastructure like automated toll booth, a smart traffic light, an automated license plate reader; computing devices of passengers in the vehicle; other vehicles (e.g., vehicle to vehicle communication, etc.), and services provided in the vehicle that handle personal data (e.g., satellite radio usage, driving security and safety services, driving pattern and behavior, etc.).

The term 'privacy risk event' as used herein may generally refer to any appropriate event where the personal data of a user is or could potentially be handled by an individual, entity, or device other than the user that is uniquely identified by the personal data.

The term 'privacy actions' as used herein may generally refer to any appropriate actions taken towards managing the handling of personal data of a user or mitigating. For example, privacy actions may include, but are not limited to, providing notifications to the user when personal data of the user is being accessed, collected, stored, shared, etc.; receiving consent from the user and providing consent to entities and devices allowing them to use the personal data of the user; controlling what the entities and devices are allowed to do with the personal data; generating and transmitting legal notices to entities handling the personal data of the user; filing and lodging complaints on behalf of the user; etc.

Referring now to FIG. 1, a data privacy and security management system (hereinafter 'system') is depicted and generally designated 100. The system 100 may include a vehicle 102 having one or more in-vehicle modules 104, where the vehicle 102 and/or in-vehicle modules 104 may be capable of and configured to handle personal data of a user 106 within the vehicle 102 and/or individuals 107 outside of the vehicle 102. In some example embodiments, the vehicle 102 and/or in-vehicle modules 104 may be configured to handle personal data of the user 106 and/or individuals 107 when the user 106 actively connects to and/or engages with the in-vehicle modules 104 for various operations, such as, making phone calls, getting navigation information, paying toll, initiate safety assistance, initiate driving assistance such as auto-pilot or self-drive function, etc. In some other example embodiments, the vehicle 102 and/or in-vehicle modules 104 may be configured to handle personal data of the user 106 and/or individuals 107 merely in response to be being operational or being in proximity to the vehicle 102 and/or in-vehicle modules 104. For example, Tesla vehicles have outward facing cameras that capture footage of the surroundings of the vehicle (including individuals 107) either while being driven or when set in sentry mode when the vehicle is unattended. In said example, the personal data of the individual 107 may be captured (e.g., video or face) without knowledge of the individual 107 if they are in proximity to the vehicle without the individual having done anything actively to trigger such collection of personal data (e.g., actively connecting to the vehicle with a computing device, etc.). That is, in said example embodiments, the vehicle 102 and/or in-vehicle modules 104 may be configured to handle personal data of the user 106 and/or individuals 107 by the mere proximity of the user 106 and/or individual 107 to the vehicle 102 and/or in-vehicle modules 104. In other example embodiments, the vehicle 102 and/or in-vehicle modules 104 may be configured to handle personal data of the user 106 and/or individuals 107 responsive to interaction of the vehicle 102 and/or in-vehicle modules 104 with other vehicles, in-vehicle modules, or external infrastructure 116 (e.g., traffic cameras, traffic lights, etc.).

In the above examples, the vehicle 102 and/or the in-vehicle modules 104 may function as nodes of an Internet of Things (IoT) network, and said nodes may access, collect, store, and/or share personal data of the user 106 and/or the individual 107: (a) passively—when said nodes are operational, come in proximity to other IoT nodes, or interact with other IoT nodes such as, but not limited to, computing devices of the user 106 and/or the individual 107, other connected vehicles, external infrastructure 116 (license plate readers, traffic cameras, or similar devices), etc., and/or (b) actively—when a user 106 connects his/her phone to in-vehicle modules 104 via Bluetooth (or other wireless technologies), engages a service (e.g., eCall, Sirius XM, etc.), installs an aftermarket device (e.g., dongles from insurance companies, anti-theft device, toll booth transponders, etc.), or when said nodes interact with other IoT nodes. While the examples of IoT nodes (e.g., the ones with which that the vehicle 102 or in-vehicle modules 104 interact) provided above pertain to devices, it is noted that IoT nodes may include any appropriate IoT resources such as, IoT apps, IoT services, IoT devices, etc., according to various embodiments of the present disclosure.

The vehicle 102 may include, but is not limited to, one of a number of different types of automobiles or motor vehicle, such as, for example, a sedan, a wagon, a truck, or a sport utility vehicle (SUV), and may be two-wheel drive (2WD) (e.g., rear-wheel drive or front-wheel drive), four-wheel drive (4WD), or all-wheel drive (AWD), hybrid vehicles, electric vehicles, motorcycles, etc. The vehicle 102 may be personal vehicle, a leased vehicle, or a rented vehicle.

Further, in some examples, the vehicle may be a connected vehicle that operates as an IoT device/node as described above.

The user 106 may include either a private owner of the vehicle, other users who are related to and are authorized by the private owner to use the vehicle (e.g., spouse, kids, friends, etc.,), an individual who leases or rents the vehicle from a dealership or a rental agency, etc. In some example embodiments, the user 106 may be an entity, such as a rental agency, dealership, etc. The user 106 may include the driver and/or passengers in the vehicle 102 (e.g., any person in the vehicle 102 whose personal data may be accessed, collected, stored, or shared by the vehicle 102 or in-vehicle modules 104).

The user 106 may have a user computing device 108. The user computing device 108 may be a portable computing device having display (or other I/O interface like speaker, microphone, gesture recognition software, etc.), user interaction, and/or network communication capabilities (e.g., Internet connectivity), such as, a mobile phone, a laptop, a tablet, a smart phone, any other appropriate hand held device, a wearable computing device, etc. In some example embodiments, the user computing device 108 may also include a computing system in-built in the vehicle that has a display, user interaction, and/or network communication capabilities. The user computing device 108 is configured to be communicatively coupled to one or more in-vehicle modules 104 of the vehicle 102 (either automatically or based at least in part on user action). In some embodiments, the user computing device 108 may include a privacy manager 312 (shown in FIG. 3) which may be a client application of a privacy server 112.

Further, as illustrated in FIG. 1, the system 100 includes a privacy server 112. The privacy server 112 may be communicatively coupled to the user computing device 108 and one or more privacy data sources (114_1, 114_2 . . . 114_N, hereinafter collectively 114; and 124_1, 124_2, . . . , 124_N, hereinafter collectively 124) via a network 110. In some embodiments, the network 110 may include the Internet, a public switched telephone network, a digital or cellular network, other networks, or any combination thereof. In some embodiments, the privacy data sources 114 and 128 may include digital/web servers, repositories, data storage sources, databases, registries etc., that provide personal data approaches of entities, such as, but not limited to, manufacturer of the vehicle, in-vehicle unit manufacturers, in-vehicle service providers, third party businesses with whom data is shared by the manufacturers or service providers, partners associated with the manufacturers, and/or other entities that handle personal data of the user obtained from a vehicle. Further, the privacy data sources 114 and 128 may include data registries that provide information regarding IoT resources (e.g., IoT apps, devices, services, etc.) and relevant attributes associated with each IoT resource, such as attributes describing the IoT resource's data collection and use practices (e.g., what data is being collected, how long it is retained, whether it is aggregated or anonymized, for what purpose it is collected, which third parties it might be shared with, if any, etc.), specific settings made available to users, if any (e.g., opt-in/opt-out setting for allowing certain types of processing on the personal data of the user, etc.).

The privacy data sources (source_2) 124 may be different from the privacy data sources (source_1) 114 in that the privacy data sources 124 may be in-network data sources. In-network data sources may be privacy data sources associated with entities that are integrated with or considered in-network to the system 100, particularly the privacy server 112. The entities may be integrated with the privacy server 112 via APIs associated with and provided by the privacy server 112. In other example embodiments, any other appropriate mechanisms may be provided for the entities to be integrated with the system 100, e.g., mechanisms that allow direct machine to machine communication between data sources of the entities and the privacy server 112. Entities that are in-network to the system 100 may freely and directly exchange data with the privacy server 112. The privacy data sources 114 may be associated with entities that are not integrated with the system 100 or the privacy server 112.

In some embodiments, the privacy server 112 may receive data from the user computing device 108 and the privacy data sources 114 and 124, and execute privacy actions in response to and based at least in part on the data. The data received from the user computing device 108 may include privacy preference information that is representative of permission settings configured by the user 106 or selected by the user 106 from a list of preset permission configurations, e.g., user-specific permission settings on how the user 106 wants the user's personal data to be handled. Additionally, the privacy preference information may also include preference of the user 106 regarding notifications (e.g., how and when to transmit the notifications to the user or entities, frequency of notifications, etc.). In other words, the privacy preference information that is representative of the permission settings may include, but is not limited to, consent for entities to handle the user's personal data, denial of consent for entities, details on when the notifications should be sent, how often the notifications should be sent, etc. The data received from the user computing device 108 may also include contextual data associated with the user 106, the vehicle 102, and/or the in-vehicle modules 104. The privacy server 112 may be configured to filter the privacy preference information (e.g., user-specific permission settings) based at least in part on the contextual data to generate privacy action rules. Further, the privacy server 112 may determine privacy risk events associated with the user's personal data using the contextual data and information retrieved from the privacy data sources 114. For each privacy risk event, the privacy server 112 may execute one or more context based privacy actions based at least in part on the privacy action rules. In some example embodiments, the contextual data may also be used to provide context-based permission setting options, suggestions, and/or preset permission configurations to the user 106.

In one example, the privacy server 112 may be hosted on a cloud platform. However, in other examples, the privacy server 112 may be hosted on a software as a service (SaaS) platform, or on a dedicated server in a data center without departing from a broader scope of the present disclosure.

Figure 2:
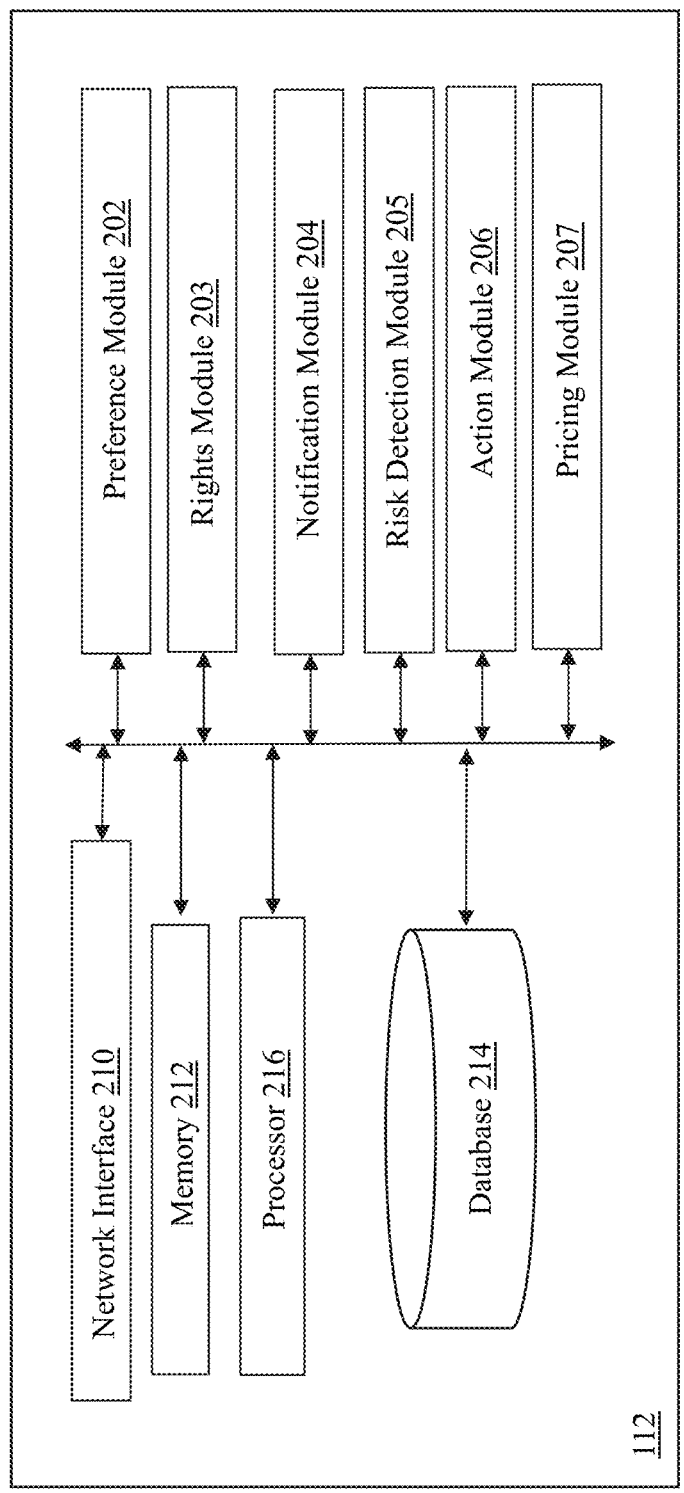
FIG. 2 illustrates an example block diagram of the privacy server of the data privacy and security management system shown in FIG. 1, in accordance with example embodiments of the present disclosure.
Figure 3:
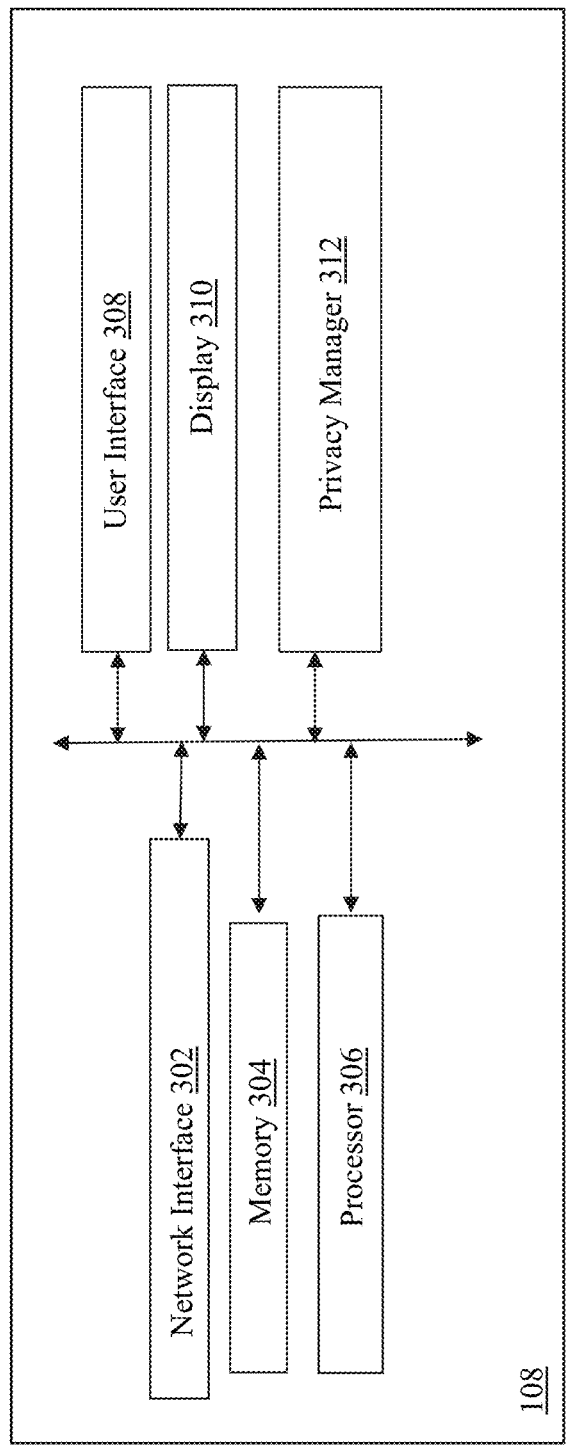
FIG. 3 illustrates an example block diagram of the user computing device of the data privacy and security management system shown in FIG. 1, in accordance with example embodiments of the present disclosure.
Figure 4A:
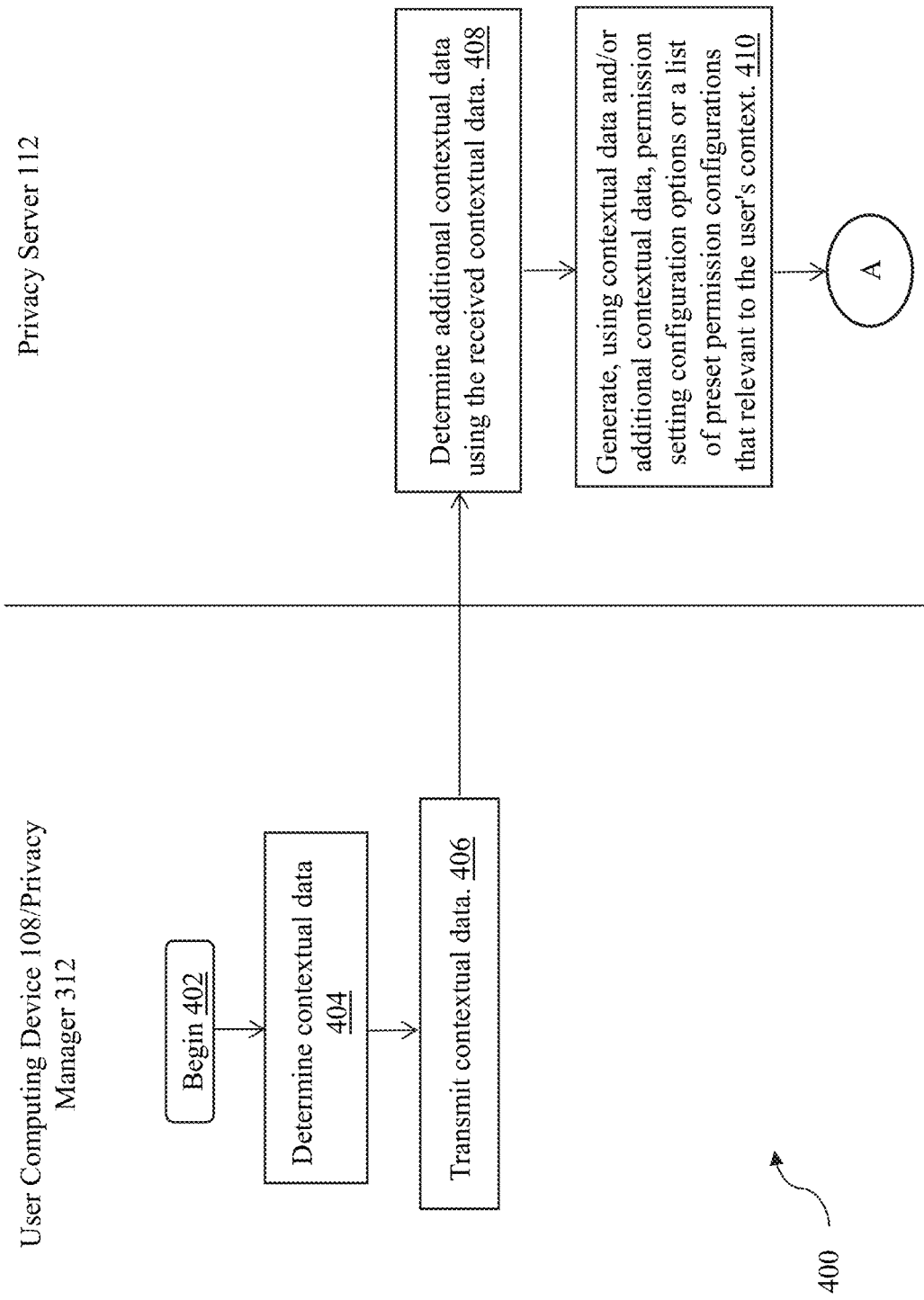
FIGS. 4A-4C (collectively 'FIG. 4') illustrates an example operation of the data privacy and security management system shown in FIG. 1, in accordance with example embodiments of the present disclosure.
Figure 4B:
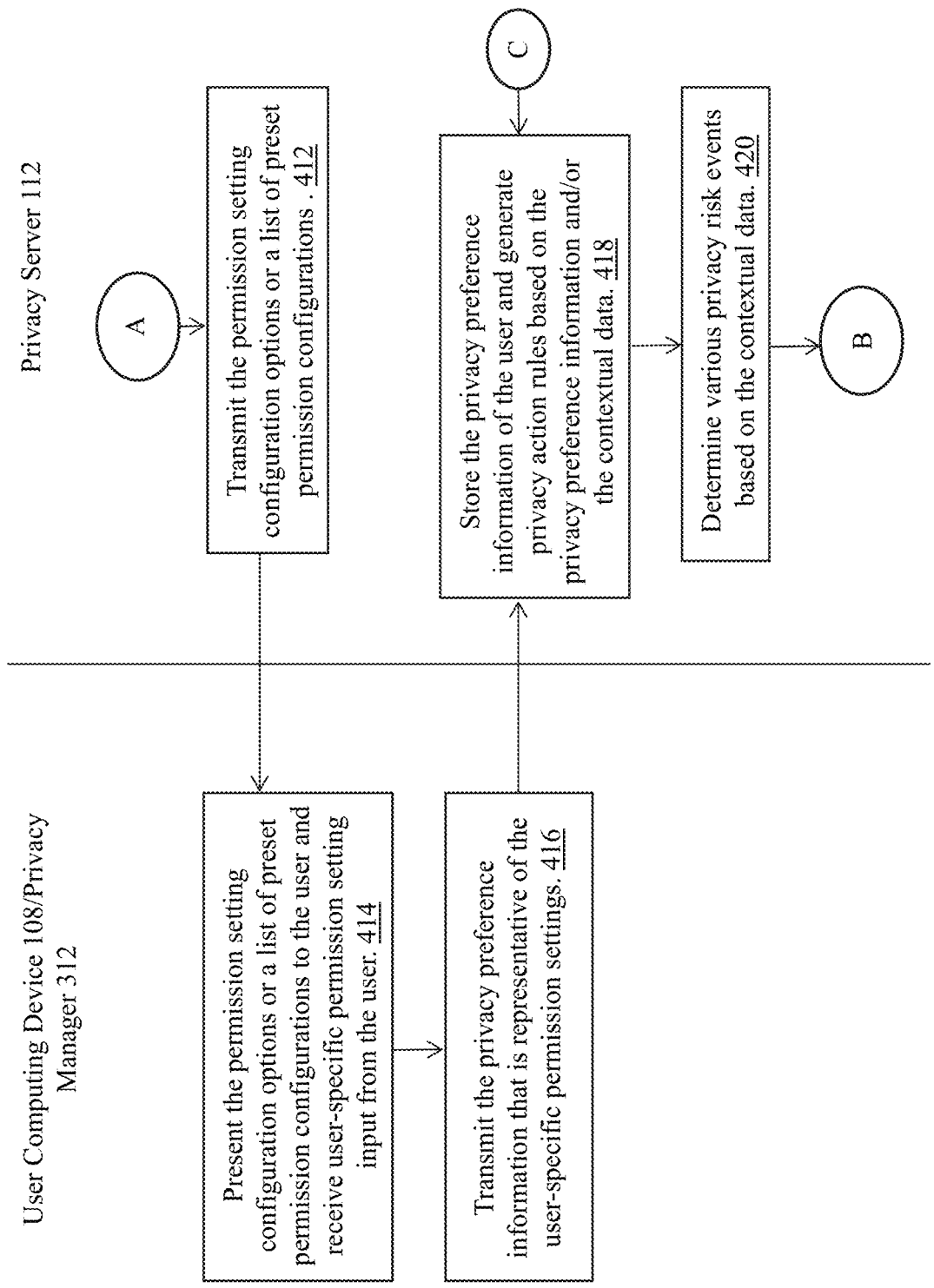
Figure 4C:
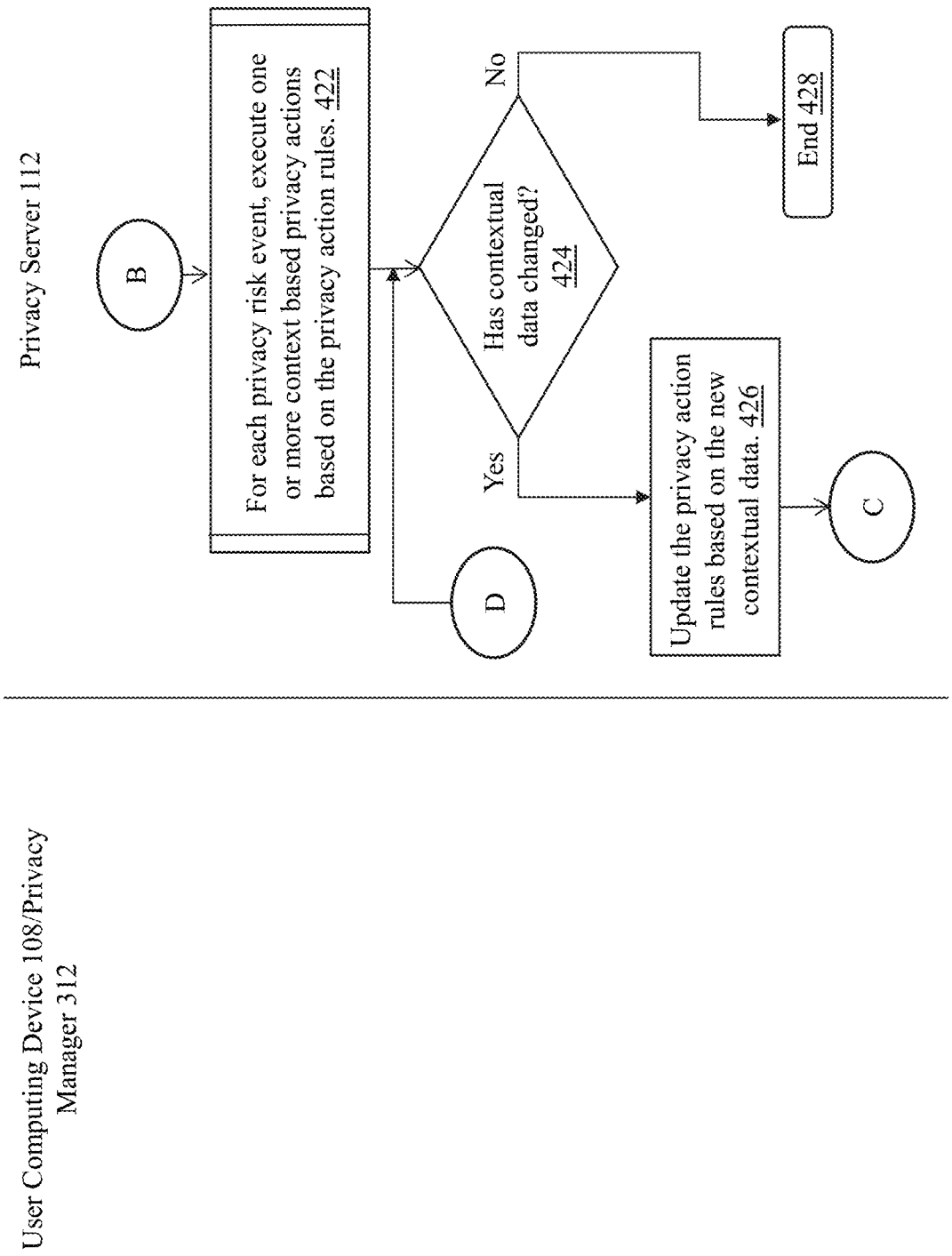

The operation of the system 100 will be described below in greater detail in association with FIG. 4 by making reference to FIGS. 2-3 which illustrates the various example components of the privacy server 112 and the user computing device 108. FIG. 4 illustrate flowcharts associated with the data privacy and security management process 400 of the system 100. Although specific operations are disclosed in the flowcharts illustrated in FIGS. 4-6, such operations are only non-limiting examples. That is, embodiments of the present invention are well suited to performing various other operations or variations of the operations recited in the flowcharts. It is appreciated that the operations in the flowcharts illustrated in FIGS. 4-6 may be performed in an order different than presented, and that not all of the operations in the flowcharts may be performed.

Figure 5:
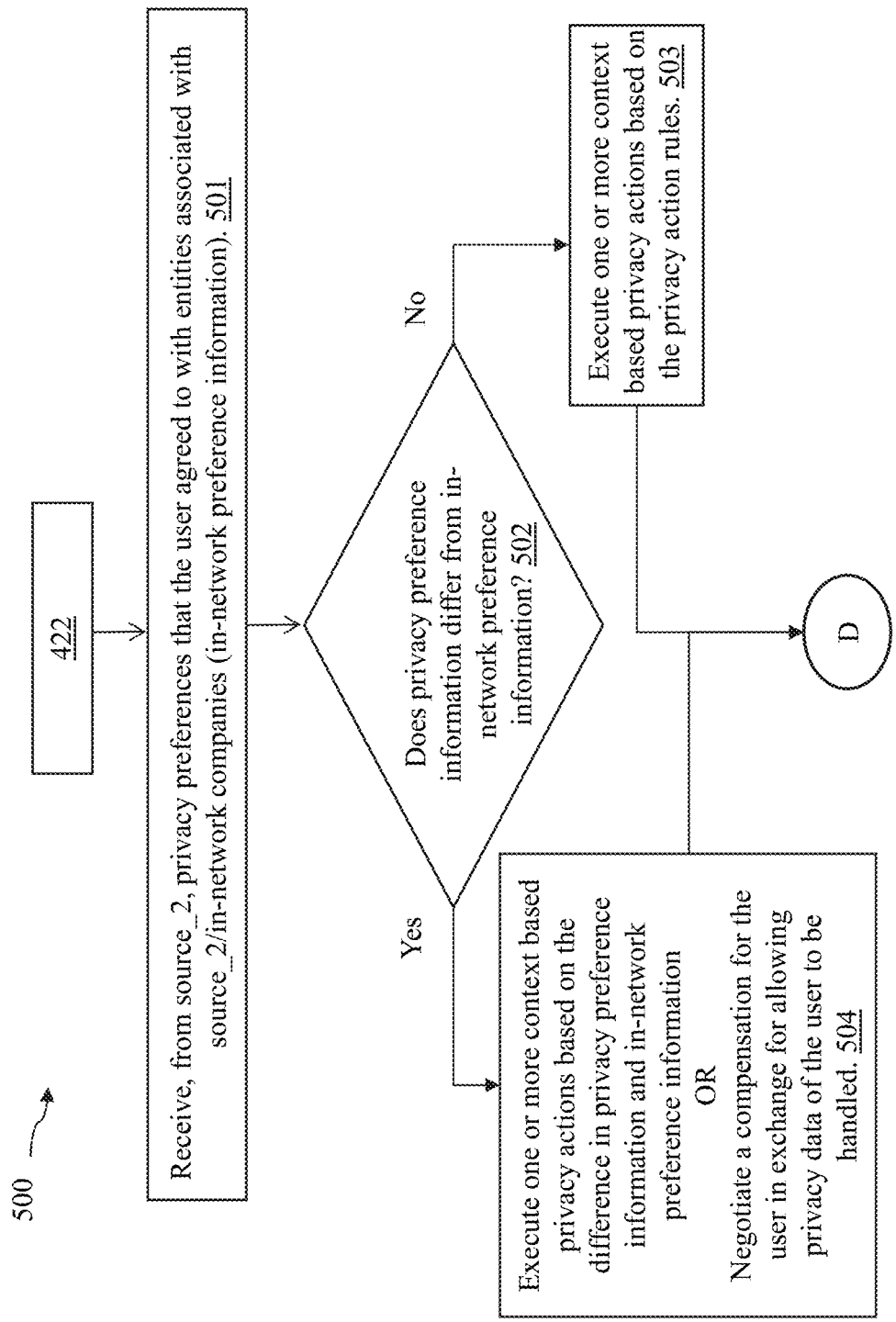
FIG. 5 illustrates an example operation of executing privacy actions, in accordance with example embodiments of the present disclosure.

All, or a portion of, the embodiments described by the flowcharts illustrated in FIGS. 4-6 can be implemented using a non-transitory computer-readable comprising computer-executable instructions which reside, for example, in a memory of the user computing device 108 and/or the privacy server 112. As described above, certain processes and operations of the present invention are realized, in one embodiment, as a series of instructions (e.g., software programs) that reside within computer readable memory of a computer system and are executed by the processor of the computer system. When executed, the instructions cause the computer system to implement the functionality of the present invention as described below.

Referring to FIG. 4, the data privacy and security management process 400 of the system 100 begins at operation 402 and proceeds to operation 404 where the privacy manager 314 determines contextual data. The contextual data may be associated with the user 106, the vehicle 102 associated with the user 106, and/or the in-vehicle modules 104 of the vehicle 102. Examples of the contextual data may include, but are not limited to, age of the user 106, citizenship of user 106, make and model of vehicle 102, vehicle identification number, personal vehicle vs rental vehicle vs leased vehicle, location of vehicle 102 (obtained from vehicle GPS system or location of user computing device 108 may be used as proxy for location of vehicle under assumption that the user computing device 108 is within or proximate to the vehicle 102), other vehicles with which the vehicle 102 is communicatively coupled (intravehicular network), etc.

In one example embodiment, the user 106 may input contextual data via the user computing device 108. The input can be typed in or provided using a hands-free technology (e.g., using speech-based interface where a speaker outputs audio and a microphone picks up the user's audible responses, using haptic interface, using gesture recognition interface, etc.). In another example embodiment, the privacy manager 312 may be configured to automatically (e.g., without input from the user 106) determine contextual data, e.g., without input from the user 106.

In some example embodiments, the privacy manager 312 may be configured to automatically determine contextual data (of vehicle 102 or in-vehicle modules 104) through communication with the vehicle 102 or any appropriate in-vehicle module 104 of the vehicle 102, e.g., when the user computing device 108 associated with the user 106 is communicatively coupled to the vehicle 102 or any appropriate in-vehicle module 104 of the vehicle. In yet another example embodiment, the privacy manager 312 may determine contextual data based at least in part on applications or software running on the user computing device 108. For example, a third-party mapping application can provide location information, or an OEM connected vehicle app to remotely unlock a vehicle 102 can provide vehicle information, or a rental car app being launched while on a rental lot can provide information whether the vehicle is a personal vehicle or a rental vehicle, etc. Contextual data of the user 106 may be determined from the details of the user 106 stored in the user-computing device 108 and/or the in-vehicle modules 104 of the vehicle 102. The automatic determination of contextual data may require permission from the user 106. Once the contextual data is collected, in operation 406, the privacy manager 312 may be configured to transmit the contextual data to the privacy server 112.

Responsive to receiving the contextual data, in operation 408, the preference module 202 may operate in concert with the risk detection module 205 and the rights module 203 to determine additional contextual data using the received contextual data. Examples of the additional contextual data may include, but is not limited to, local privacy laws and rights available to the user 106 at a given location, external infrastructure 116 (e.g., IoT devices) at the given location, all the in-vehicle modules 104 of the vehicle 102 that are capable of handling personal data of the user 106, entities related to the vehicle 102, in-vehicle modules 104, and/or the external infrastructure 116 that may handle the personal data of the user 106, the personal data handling approaches of each of said entities, user configurations allowed by said entities (e.g., opt-out options such as opt-out from applying face or scene recognition in captured video unless theft or theft attempt is determined), etc.

To obtain the additional contextual data, in operation 408, the preference module 202 operates in concert with the risk detection module 205 and the rights module 203 to query the privacy data sources 114. In one example, if the contextual data includes location of the vehicle 102, the preference module 202 may provide the location of the vehicle 102 (e.g., current location) along with the query. The location of the vehicle 102 may be used to determine IoT devices in the location or IoT devices whose areas of coverage are in the vicinity of the location (e.g., within some radius from the location, or satisfying some other criteria indicative of whether the user is likely to have the user's personal data collected by these devices such as being within the range of a system of cameras). Identifying the IoT devices in the current location of the vehicle 102 may allow the system 100 to control the collection and use of the user's personal data by the IoT devices and/or control access to sensitive functions of the IoT device (e.g., functions provided by a camera, payment or point-of-sale system, toll booth license readers, etc.). In one example, instead of or in addition to the current location of the vehicle 102, the contextual data may include the trip information including current location, destination location, and selected route (e.g., from Google Maps, Waze, in-built vehicle navigation system, etc.). In said example, in addition to determining the IoT devices at the current location of the vehicle 102, the privacy data sources 114 may be requested to provide IoT devices along the selected route and at the destination that are likely to collect and use the personal data of the user 106. Additionally, the location information may be used to determine the local privacy laws and rights available to the user 106 at a given location and/or at locations along the route. The local privacy laws and rights available to the user 106 may vary based on location and/or citizenship of the user 106. When the vehicle 102 travels across boundaries of states, counties, countries, continents, etc., the local privacy laws may vary. For example, the privacy rights available to users in Europe may significantly vary from privacy rights available to users in Asia. Further, the rights available to an EU passport holder in Europe may be different from the rights available to said user in China or India.

In another example, if the contextual data includes vehicle identification information that uniquely identifies the vehicle 102 (e.g., VIN, make, model, trim, etc.), the preference module 202 may provide said vehicle identification information to the privacy data sources 114 to identify and receive: (a) information regarding all the in-vehicle modules 104 associated with the vehicle 102, and/or (b) the privacy data handling approaches of various entities associated with the in-vehicle modules 104 and/or the vehicle 102 and that are likely to collect and use the personal data of the user 106. The in-vehicle modules 104 and/or the privacy data handling approaches may vary based on the vehicle 102. For example, in-vehicle modules and privacy policies of associated entities may vary from a Honda vehicle, to a Nissan vehicle, to a Rolls Royce vehicle, to a Porsche vehicle.

It is noted that the examples of additional contextual data provided above are non-limiting, and in other embodiments, any other appropriate additional contextual data may be retrieved from the privacy data sources 114 using the contextual data received from the user computing device 108 without departing from a broader scope of the present disclosure.

Once the preference module 202 has obtained the contextual data and any appropriate additional contextual data (hereinafter the contextual data and additional contextual data may be collectively referred to as 'contextual data' unless specified), in operation 410, the preference module 202 may use said contextual data to generate permission setting configuration options or a list of preset permission configurations that is more relevant to the user's context. This enables minimizing the number of permission setting options provided to the user 106. The permission settings may be representative of how the user 106 wants the personal data of the user 106 to be handled by the vehicle 102, the in-vehicle modules 104, external infrastructure 116 (including IoT devices), and entities associated therewith.

In one or more example embodiments, to generate the permission setting configuration options or a list of preset permission configurations, the preference module 202 may operate in concert with the rights module 203 to refine the permission setting options and/or the list of preset permission configurations presented to the user 106 based at least in part on, inter alia, local privacy laws in a location (e.g. if an individual enters the EU, GDPR and ePrivacy rules would start to apply, etc.); rights available to the user in the location (e.g., if a user is at work, employer-specific rules may supersede the rights available to the user); user profile; the type of vehicle (e.g., if a user interacts with her own vehicle different rules may apply vs another vehicle such as a rental vehicle, etc.); personal data handling approaches specific to the vehicle 102, in-vehicle modules 104, the external infrastructure 116, and/or the entities associated therewith, etc. In some example embodiments, the permission setting options and/or the list of preset permission configurations presented to the user 106 may also be refined based at least in part on historical privacy related outcomes, if available (e.g. if a relevant class action lawsuit has been filed) or if new services/third parties are now processing or suspected to process data (e.g. as determined by news sources). This is valuable for both the user (who may have different rights in different contexts) and businesses (who may change their data collection and processing and meet compliance based on these dynamic contexts).

The permission setting configuration options or the list of preset permission configurations may be generated for presentation to the user 106. Example permission settings may include, among other things, general preferences (e.g. notify if geolocation is collected, notify only for certain types of personal data collection), device-specific preferences (e.g. have low privacy settings for personal vehicle but high privacy settings for a rental vehicle, receive warnings or more detailed warnings only for certain classes of devices), situation specific preferences (e.g. allow telematics tracking while at work but turn off tracking for personal use of the vehicle), location-based preferences (e.g. turn off a service when outside of a defined geofence; increase/lower privacy settings based on local regulations), scheduled preferences (e.g. place a data deletion request every 6 months or more frequently as allowed by local laws, set reminders or trigger a complaint if a data request has not been responded to in the timeframe allowed by local legislation), etc.

In one example embodiment, the permission setting configuration options and/or the list of preset permission configurations may be generated and refined over time based at least in part on various factors such as, but not limited to, privacy preferences of a population of users (or possibly a subset of people in that population) using the platform, using historical privacy preferences of the user 106, other any other information associated with privacy of the user's personal data (e.g., news about recent privacy law suit, claims, new laws, etc.).

In some example embodiments, the permission configurations may be generated using artificial intelligence (e.g., machine learning techniques such as supervised or unsupervised learning techniques, clustering techniques, collaborative filtering techniques, content-based filtering techniques, logistic regression techniques, support vector machine techniques, Bayesian inference techniques, decision tree learning techniques, deep learning techniques, etc., may be used to generate permission setting configuration models/option models using training data obtained from test users). The generation and refinement of permission settings (e.g., by analysis, artificial intelligence, etc.) may also be extended to determining notification preferences of users (e.g. whether, when, and how a user expects to be notified about different types of personal data handling). Suggestions can also be provided to users on how to better manage their privacy based on the various factors as listed above. It is noted that the factors listed above are examples and are non-limiting. In one example, users of the system 100 who rented vehicles from one rental company may have opted a first set of permission settings, while others from a second rental company may have opted a second set of permission settings. Accordingly, in said example, when the contextual data indicates that the user is renting a vehicle from the first rental company, the preference module 202 may be configured to suggest the first set of permission settings to the user 106. In another example, initially a trend of permission settings among users with respect to collection of personal data by smart traffic lights may be lenient. Over time, when the preference module 202 determines that trend with respect to permission settings associated with the traffic light data collection is becoming stricter, new permission setting recommendations may be provided to the user 106.

Responsive to generating the permission setting configuration options and/or the list of preset permission configurations, in operation 412, the privacy server 112 may transmit the permission setting configuration options and/or the list of preset permission configurations to the user computing device 108 for presentation to the user 106. In operation 414, the privacy manager 312 may operate in concert with the user interface 308 to present the permission setting configuration options and/or the list of preset permission configurations to the user 106 via the display 310 of the user computing device 108. The user 106 may configure user-specific permission settings through the permission setting configuration options presented to the user 106 (e.g., using radio buttons, checkboxes, sliding scale, ratings, drop downs, etc.) where the user individually sets each permission setting. Alternatively, the user 106 may select a preset permission configuration of the user's choice. For example, a user 106 may choose from a strict privacy setting, moderate privacy setting, or lenient privacy settings, etc. In some example embodiments, a combination of both preset permission configuration and permission setting configuration options may be provided to the user 106. In some example embodiments, in lieu of or in addition to a visual presentation, the permission setting configuration options and/or the list of preset permission configurations may be presented using the audio system or any other appropriate medium available on the user computing device 108 and/or the in-vehicle module 104 (e.g., infotainment system). Similarly, user input may be received using an auditory medium (microphone) or any other appropriate medium available (e.g., gesture recognition, other hands free technology, etc.). The alternate mediums may be used to communicate with and receive input from the user 106 to prevent the user 106 from being distracted while operating the vehicle 102.

In some example embodiments, the permission setting configuration options or the list of preset permission configurations provided to the user 106 may be basic/generic permission settings (e.g., that are not specific to the context of the user). In other example embodiments, initially, the permission setting configuration options or the list of preset permission configurations that are provided to the user 106 may be basic/generic permission settings. Then, subsequent to receiving contextual data, advanced and/or refined permission setting configuration options or the list of preset permission configurations that are more relevant to the user's context may be provided. In some cases, where the privacy server 112 determines that certain privacy option based at least in part on the basic/generic permission settings are unavailable in view of the contextual data, the privacy server 112 may instruct the privacy manager 314 to notify the user 106 that said certain privacy option would be unavailable. Reasons for the unavailability may also be provided succinctly. For example, generic settings may allow a user to deny permission for applying facial recognition on any video of the user that is captured at a traffic camera. However, upon obtaining contextual data that locates the user as being in a country that does not allow such denial of permissions to apply facial recognition, the privacy manager 312 may be configured to present a notification to the user 106 via the user computing device 108—the notification informing the user 106 that said privacy option is not available to the user in the current location of the user and it will be re-enabled when the user enters a location that allows such rights. In said example, the privacy manager 312 and the privacy server 112 may be configured to provide the next best privacy option to the user 106. The next best privacy option may be communicated to the user 106 to receive the user's consent. Alternatively, the next best privacy option may be automatically selected for the user 106 based at least in part on other permission settings of the user 106 (e.g., do no notify for next best privacy option selection). In some embodiments of the above example, no notifications may be provided to the user 106 based on the other permission settings of the user 106.

In response to presenting the different permission setting configuration options and/or the list of preset permission configurations, in operation 414, the privacy manager 312 may receive privacy preference information that is representative of the permission settings that are configured or selected by the user, e.g., user-specific permission settings. Then, in operation 416, the privacy preference information may be transmitted to the privacy server 112. Upon receiving the privacy preference information, in operation 418, the privacy preference information may be stored in the database 214 of the privacy server 112. Further, in operation 418, the notification module 204 of the privacy server 112 may use the privacy preference information to generate privacy action rules that determine how the privacy manager 312 and/or the privacy server 112 manages privacy actions in response to a privacy risk event. The privacy action rules may be stored in a database 214 of the privacy server 112.

Then, in operation 420, the risk detection module 205 may operate in concert with the privacy manager 312 in the user computing device 108 to determine various privacy risk events. The risk detection module 205 may determine the privacy risk events based at least in part on the contextual data (e.g., both contextual data received from the user computing device 108 and additional contextual data retrieved from the privacy data sources 114). So even though the present disclosure describes that the privacy risk detection occurs in operation 420, it is noted that the privacy risk events can be determined in operation 408 when the contextual data is initially received. In other words, while FIG. 4 illustrates the various operations being done sequentially, it is noted that in some example embodiments, one or more operations in FIG. 4 may be executed in parallel or different from the order shown in FIG. 4 without departing from a broader scope of the present disclosure. In some example embodiments, in addition to detecting the various privacy risk events, the risk detection module 205 may be configured to rate and rank each privacy risk event. The risk events may be rated and ranked using artificial intelligence techniques as described elsewhere in this description (crowdsourced information, or other such information may be used). Example of privacy risk events may include, but is not limited to, entering the coverage area of a traffic camera that captures video of the vehicle 102, passing through a toll booth that reads the license plate of the vehicle 102, accessing satellite radio service in the vehicle 102, having an insurance dongle in the vehicle 102 that collects and send personal data of the user 106 to a third party server, enabling a driving assist mode of the vehicle that collects and maybe sells driving data of the user 106, etc.

Once the privacy risk events have been determined, in operation 422, the notification module 204 may be configured to execute one or more context based privacy actions per privacy risk event based at least in part on the privacy action rules stored in the database 214. The step of executing the context based privacy actions may include, among other things, communicating notifications to the privacy manager 312 and presenting them to user 106 via the user computing device 108, and communicating notifications to entities that have been identified as potential handlers of the user's personal data. Some notifications may be merely informative (e.g., informing the user that video of the user is or may be captured, informing user that geolocation of the user may be collected and stored by the satellite radio, information the user that the user is entering a new country and certain privacy preferences may be unavailable and other new privacy options may be available, etc.), while others may require action from the user 106 (e.g., receive consent to collect, access, share, or sell personal data). Examples of context based privacy actions may include, but are not limited to, presenting notifications to the user based at least in part on different geographies, use cases, employer rules, etc., accepting consent by default for a set of data collections but not others—accepting consent to geolocation collection for safety features and research but denying consent for the same data to be used for profiling purposes or to be shared with third parties, presenting notifications requiring consent only when the vehicle is in park or while driver is not driving if a risk event associated with new IoT device is detected for which a user-specific privacy preference is not available, presenting notifications to the user only when personal data that is collected will be stored for more than a week, etc.

In some example embodiments, the notifications may not be presented by the privacy manager 312 if it is determined that the user 106 is operating the vehicle 102. In other example embodiments, the notifications may be presented to the user 106 while the user 106 is operating the vehicle 102 provided that the notifications can be presented in a manner that does not compromise the safety of the user 106 or distracts the user 106 (e.g., requires the user to take the hands of the wheel or take eyes of the road). In some examples, the notifications may be presented using the audio system of the user computing device 108 and/or the vehicle 102 (e.g., infotainment system)

In addition to serving notifications to the user 106, the privacy actions may include sending request notifications and/or legal notices to the entities (or potential entities) associated with the privacy risk event, where the entities handle or could potentially handle the personal data of the user 106. The legal notices may be generated and filed on behalf of the user 106. In other words, the system 100 may operate as a privacy mediation platform between the user 106 and the entities associated with the vehicle 102, in-vehicle units 104, and external infrastructure 116 that handles (or could potentially handle) the personal data of the user 106. The notification module 204 may operate in concert with the action module 206 to serve the various request notifications and legal notices to the entities. The action module 206 may be configured to determine the requirements associated with serving legal notices and/or sending the request notifications. For example, the action module 206 may determine the format in each entity needs to be contacted (e.g., form, email, etc.), whether a notification refusing the permission to handle personal data has to be filed initially to serve a valid legal notice later, etc. The request notifications may include notifying the entities regarding consent or denial of permission to handle the personal data of the user or specific aspects thereof. The request notifications and legal notices may be served based at least in part on the privacy action rules which are determined based at least in part on the privacy preference information of the user 106 and/or the contextual data. Examples of the request notifications may include, but are not limited to, the request notification may inform the entities that they are allowed to capture video, but not apply any facial recognition, it may inform the entities that the user 106 does not want his/her personal data to be sold to any other third party entities, it may notify the entities (e.g., private parking lot companies) to delete the personal data of the user 106 after the vehicle 102 has left the parking lot, etc.

Responsive to sending legal notices or request notifications to the entities, in operation 422, the action module 206 may initiate a timer to determine whether the concerned entities comply and/or respond to the request notifications and/or legal notices within a given timeframe. If the entities do not comply and/or respond, then, the action module 206 may be configured to take further actions with higher authorities (e.g., attorney general) on behalf of the user 106. The responses received from the entities may be used by the privacy server 112 to determine the different entities that handle the personal data of the user 106. In some examples, various characteristics of the responses (e.g., pattern, style, etc.) may be analyzed using artificial intelligence algorithms to determine the entities handling the personal data of the user. The privacy server 112 may use the responses to create a mapping of the various devices and corresponding entities associate with the devices that handle the privacy data of the user 106.

Context based privacy actions may minimize the number of notifications presented to the user because the notifications are specific to and based on the user's context which is determined from the contextual data. That is, notifications may be served based on various factors determined from the contextual data such as, but not limited to, location, event, specific to type of vehicle, type of situation, type of IoT device, etc. For example, notification for a General Motors (GM) vehicle will be different from notifications for a Honda vehicle because their privacy policies are different, notification for a same vehicle will be different from when you are stationary vs when you go through a smart traffic light vs when you are going through a toll booth vs another situation (e.g., driving by camera intersection), etc. Further, it is noted that the notifications may be communicated to the user 106 in a way that is easy to read/hear and understand. For example, instead of presenting a huge long legal document regarding privacy rights, the notification module 204 may be configured to present a very concise and brief notice may be provided to the user 106. The notification module 204 may be configured to process the personal data handling approach data received from the privacy data sources 114 and summarize said documents using artificial intelligence (e.g., machine learning algorithms as mentioned above) to a form that is concise and easy to read/hear and understand while still providing the accurate information to the user 106. In some examples, the notification module 204 may be configured to provide a drill down option where the user 106 is initially presented the brief/concise notice with the option to obtain more detailed notice, if requested by the user 106. The presentation of data in a form that is brief or concise and easy to read/hear and understand may be extended to the presentation of permission settings options and preset permission configurations as well.

Operation 500 of FIG. 5 illustrates an example embodiment of operation 422, e.g., the step of executing the context based privacy actions. Turning to FIG. 5, in operation 501, the action module 206 of the privacy server 112 may communicate with the in-network data sources 124 to determine information associated with privacy preferences of the user 106 and/or information associated with services provided to or available to the vehicle 102 of the user 106.

In one example, the action module 206 may be query the in-network data sources 124 for information associated with privacy preferences of the user 106 and/or information associated with services provided to or available to the vehicle 102. As part of the query, the action module 206 may provide information associated with the vehicle 102 and/or the user 106 to the in-network data sources 124. Responsively, the in-network data sources 124 may provide: (a) information of services associated with the vehicle (e.g., services available to the vehicle, services subscribed to by the user, etc.), and/or (b) information of permissions provided by and/or consent received from the user 106 with respect to handling personal data of the user 106. The information received from the in-network data sources 124 may be specific to information available to the entities associated with the in-network data sources 124 (e.g., entities integrated with the system 100 and/or privacy server 112) through an interaction of the user 106 with said entities. For example, the user 106 purchases a General Motors (GM) vehicle and at the time of purchase, the user 106 interacts with GM and subscribes for Onstar services and consents to have the personal data of the user being handled by GM, Onstar service provider, and/or other third parties associated with the Onstar service. In said example, the consent provided by the user and the services (e.g., Onstar, other services, etc.) subscribed by the user may be stored in a data source associated with GM (in-network data source 124). Upon receiving a query from the privacy server 112, in said example, the data source associated with GM may provide said information associated with the user 106, services subscribed by the user 106, and/or consent provided by the user 106. Additionally, the data source 124 may provide additional information such as, but not limited to, other services that are available for the particular vehicle purchased by the user 106. It is noted that the information received from the in-network data sources 124 may be referred to as in-network preference information.

Upon receiving the in-network preference information, in operation 502, the action module 206 of the privacy server 112 may be configured to compare the in-network preference information received from the in-network data sources 124 with the privacy preference information that is representative of the permission settings that are configured or selected by the user via the privacy manager 312. That is, based at least in part on operations 501 and 502, the privacy server 112 knows the previous privacy settings and consents of the user 106 with in-network entities, and is able to further determine the difference between the settings of the user provided via the privacy manager 312 (which may be more informed settings based on suggestions provided by the privacy manager through artificial intelligence, crowdsourcing, historical privacy selections of other users, etc.) and what the user agreed to in the user's interaction with the in-network entities (e.g., selections made in the past and/or made with very little information on the consequences of the privacy selections).

If the in-network preference information does not differ from the privacy preference information, then in operation 503, the notification module 204 may be configured to execute one or more context based privacy actions per privacy risk event based at least in part on the privacy action rules stored in the database 214 as described above (or elsewhere in this disclosure). However, if the in-network preference information does not differ from the privacy preference information, then operation 500 proceeds to operation 504. In one example, in operation 504, the notification module 204 may be configured to execute one or more context based privacy actions based at least in part on the differences in the privacy preference information and the in-network preference information. The privacy action may include, but is not limited to, informing the in-network entity and/or other entities about the differences in the privacy preference information and the in-network preference information, where the in-network entity and/or other entities may be handling the personal data of the user 106. For example, a user 106 may have subscribed to Onstar service with GM as part of owning a GM vehicle and allowed GM, Onstar service provider, and other third parties to have access to the user's personal data. Later the user 106 uses the system 100 and configures privacy settings via the privacy manager 312, where the privacy settings indicate that the user does not want the Onstar service provider and third parties associated with the Onstar service provider to store or access certain personal data of the user 106. In said example, the notification module 204 may determine that the user's permission settings with respect to how the Onstar service provider and the third party handles the user's personal data has changed. As such, the notification module 204 may inform the Onstar service provider and the third party that the user's preference has changed and instruct the Onstar service provider and the third party that the user no longer wants certain personal data of the user 106 to be stored or accessed by the Onstar service provider and the third party. Or if the privacy preference information indicates that the user no longer wants the Onstar service to be active, the notification module 204 may inform the Onstar service provider and GM that the Onstar service or the personal data handling feature associated with the Onstar service should be turned off.

In another example, in operation 504, the notification module 204 may be configured to operate in concert with the pricing module 207 to negotiate a compensation for the user 106 in exchange for allowing the personal data of the user 106 to be handled by entities directly or indirectly associated with the vehicle 102, in-vehicle modules 104, and/or services provided by the vehicle 102 and/or in-vehicle modules 104. The compensation may be monetary or non-monetary. In some embodiments, the pricing module 207 may be configured to determine the appropriate compensation by using artificial intelligence algorithms (machine learning) and/or game theory techniques. In other embodiments, the pricing module 207 may be configured to determine the appropriate compensation by statistical analysis techniques, by using historical data, and/or based on crowdsources information associated with compensations obtained by other users for exchange of similar personal data. In some other embodiments, the pricing module 207 may be configured to determine, negotiate, or settle on a compensation based on a bidding model (or game theory models) where the highest bidder (or a bidder satisfying some other critical criteria) may be provided access to the personal data in exchange for the compensation promised by the winning bidder. The negotiations may be made through machine to machine communications with minimal or no input from the user 106. For example, the pricing module 207 may inform the personal data handling entity that they would be allowed to handle the user's personal data in exchange for a compensation for the user 106. In said example, the personal data handling entity may propose a compensation of $X in exchange for access to the user's personal data. The pricing model 207 may make a counter proposal and negotiate on behalf of the user 106 for a compensation of $Y (Y>X). As described above, the negotiations may be based at least in part on information obtained through machine learning, or other techniques to obtain the best possible outcome for the user 106.

Once the privacy actions have been executed, in operation 424, the notification module 204 may determine whether the contextual data has changed. One of the unique challenges of implementing the data privacy and security management system 100 of the present disclosure in vehicles is that the contextual data dynamically changes with time which in turn changes the privacy risk events. Context based privacy actions are based at least in part on the context of the user 106, where the context is determined from the contextual data. As such, a change in the contextual data may change the context based privacy actions executed by the system 100. In some example embodiments, in operation 424, the privacy server 112 may receive new contextual data from the privacy manager 312 user computing device 108. The privacy manager 312 of the user computing device 108 may be configured to transmit the new contextual data at pre-defined intervals either automatically or in response to a query from the privacy server 112. For example, the privacy manager 312 may be configured to transmit contextual data every 10 minutes, 15 minutes, 1 hour, etc. In other example embodiments, other appropriate triggers (e.g., change in location or other triggers not based on time) may be set to collect and transmit contextual data to the privacy server 112. The contextual data transmitted to and received by the privacy server 112 in operations 402-408 may be considered as contextual data at a first time and the new contextual data transmitted to and received by the privacy server 112 in operation 424 may be considered as contextual data at a second time, where the second time is subsequent to the first time.

Responsive to receiving the contextual data, in operation 424, the notification module 204 may be configured to compare the new contextual data received in operation 424 with the contextual data received in operation 408. If the contextual data has changed, then, in operation 426, the notification module 204 may be configured to apply a filter on the privacy preference information based at least in part on the new contextual data to update the privacy action rules. That is, a filter may be applied to the things that you could potentially do (preferences set by user) to actually what is possible to do based at least in part on the new contextual data (including local rules and regulations). Further, the updated privacy action rules may be stored in the database 214 or the updated privacy action rules may replace the existing privacy action rules associated with the user 106 in the database 214. Then, as described above in operations 420-422, the privacy server 112 may be configured to determine the privacy risk events associated with the new contextual data and execute context based privacy actions based at least in part on the updated privacy action rules. If any of the privacy risk events associated with the new contextual data do not have any user-specific preferences (permission settings) associated therewith, the notification module 204 may operate in concert with the preference module 202 to either: (a) automatically select permission settings associated with said privacy risk event (e.g., using analysis techniques or machine learning models generated based at least in part on historical user-specific preference data, preferences of a population of users using the platform, etc.) or (b) present permission setting configuration options and/or the list of preset permission configurations associated with the privacy risk event to the user 106. It is noted that the automatic selection of permission settings and/or presentation of permission setting options may also be driven based at least in part on context and/or other/existing permission settings of the user 106. For example, the existing permission settings/preferences (from operation 402-408) indicate that the user 106 does not want to be presented with additional permission settings for newly identified IoT devices unless the IoT devices sell the personal data of the user to third parties. In said example, at a new location of the vehicle 102, if a new IoT device that just collects and temporarily stores license plate numbers of the vehicle 102 is identified, the preference module 202 may not present permission settings configurations to the user 106 for the new IoT device and may automatically select the best permission setting associated with collection of license plate numbers.

In operation 424, if it is determined that the contextual data has not changed, the process may end in operation 428. It is noted that the system 100 creates a standard. While single vehicle manufacturers may have ways to notify and receive consent from the user, most people drive multiple types of vehicles which creates a friction where every time the user has to set preferences based at least in part on the vehicle the user drives. Since the system 100 is implemented on a user computing device, the system 100 remains unaffected even when the user changes between different vehicles.

The various modules of the user computing device 108 and the privacy server 112 may be configured to operate with the respective processors (216, 306), memory (212, 304), and the network interfaces (210, 302) to execute the various operations of the security management process 400 and communicate (e.g., wireless or wired) with each other and any other appropriate systems, data sources (e.g., 114), etc.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine readable medium). For example, the various electrical structures and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

In addition, it will be appreciated that the various operations, processes, and methods disclosed herein may be embodied in a non-transitory machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A data privacy and security management system for a vehicle, the system comprising:
   a privacy server configured to:
      receive a first set of contextual data associated with at least one of the vehicle, an in-vehicle module of the vehicle, or a user of the vehicle;
      determine a second set of contextual data based on at least in part the first set of contextual data;
      receive privacy preference information of the user of the vehicle, the privacy preference information being representative of user-specific permission settings that define preference of the user regarding handling of personal data of the user;
      generate privacy action rules based on the privacy preference information, the first set of contextual data, and the second set of contextual data;
      determine, using the first set of contextual data and the second set of contextual data, privacy risk events associated with at least one of the vehicle, the in-vehicle module, or the user; and
      for each privacy risk event, execute one or more context based privacy actions based at least in part on the privacy action rules;
      wherein the privacy server comprises a computer hardware device.

2. The system of claim 1, wherein the context based privacy actions comprise sending request notifications or legal notices to an entity associated with the privacy risk event, wherein the entity handles the personal data of the user, wherein the request notifications or legal notices comprise a request to change how the personal data of the user is handled.

3. The system of claim 1, wherein the context based privacy actions comprise presenting notifications to the user based at least in part on at least one of the first set of contextual data or the second set of contextual data.

4. The system of claim 3, wherein the notifications comprises at least one of an informative notification or a notification requiring an action from the user.

5. The system of claim 1, wherein the context based privacy actions comprise negotiating, with an entity, a compensation for the user in exchange for allowing the entity to handle the personal data of the user.

6. The system of claim 1, wherein the privacy server is configured to generate permission setting options based at least in part on at least one of the first set of contextual data or the second set of contextual data.

7. The system of claim 6, wherein the privacy server is configured to transmit the permission setting options to a user computing device.

8. The system of claim 1, wherein the privacy server is configured to:
   determine a change in at least one of the first set of contextual data or the second set of contextual data; and
   update the privacy action rules based at least in part on the change in the contextual data.

9. The system of claim 1, wherein the privacy action rules are stored in a database of the privacy server.

10. The system of claim 1, wherein the privacy server is configured to receive the first set of contextual data and the second set of contextual data via a network.

11. The system of claim 1, wherein the context based privacy actions comprise:
    sending a request notification to an entity that handles the personal data of the user, the request notification comprising a request for the entity to change its handling of the personal data of the user; and
    issuing a complaint to the entity or a legal authority if a response to the request is not received within a time period designated by applicable laws.

12. The system of claim 11, wherein the context based privacy actions further comprise issuing one or more responses on behalf of the user to mediate a privacy requirement in connection with the issuance of the complaint to the entity or the legal authority.

13. The system of claim 1, wherein the context based privacy actions comprise:
    sending a request notification to an entity that handles the personal data of the user, the request notification comprising a request for the entity to delete the personal data of the user.

14. The system of claim 1, wherein the context based privacy actions comprise:
    sending a request notification to an entity that handles the personal data of the user, the request notification comprising a request for the entity to delete the personal data of the user; and
    receiving a response notification from the entity, the response notification comprising confirmation of the deletion by the entity of the personal data of the user.

15. The system of claim 14, wherein the context based privacy actions further compromise:
    generating an electronic communication for delivery to the user, the electronic communication comprising confirmation of the deletion by the entity of the personal data of the user; and
    delivering the electronic communication.

16. The system of claim 1, wherein the context based privacy actions comprise:
    sending a request notification to an entity that handles the personal data of the user, the request notification comprising a request for the entity to delete the personal data of the user; and
    issuing a complaint to one of the entity and a legal authority if a response to the request is not received within a time period designated by applicable laws.

17. The system of claim 16, wherein the context based privacy actions further compromise:
    generating an electronic communication to send the user, the electronic communication comprising information regarding the complaint to one of the entity and the legal authority; and
    presenting the electronic communication to the user.

18. The system of claim 1, wherein the context based privacy actions comprise:
    sending a request notification to an entity that handles the personal data of the user, the request notification comprising a request for the entity to delete the personal data of the user;
    receiving a response notification from the entity, the response notification comprising a refusal by the entity to delete the personal data of the user; and
    issuing a complaint to a legal authority regarding the refusal by the entity to delete the personal data of the user.

19. The system of claim 1, wherein the permission settings comprise scheduled preferences, wherein the schedule preferences comprise a preference for the context based privacy actions to comprise sending periodic request notifications to an entity that handles the personal data of the user, the request notifications comprising a request for the entity to delete the personal data of the user.

20. A non-transitory computer readable medium embodying instructions executable in a computing device, the instructions, when executed by the computing device causing the computing device to at least:
receive a first set of contextual data associated with at least one of a vehicle, an in-vehicle module of the vehicle, or a user of the vehicle;
determine a second set of contextual data based on at least in part the first set of contextual data;
receive privacy preference information identifying permission settings that define preferences for handling of personal data of the user;
generate privacy action rules based on the privacy preference information, the first set of contextual data, and the second set of contextual data;
determine, using the first set of contextual data and the second set of contextual data, a privacy risk event associated with at least one of the vehicle, the in-vehicle module, or the user; and
for the privacy risk event, execute one or more privacy actions based at least in part on the privacy action rules.

21. The non-transitory computer readable medium of claim 20, wherein the privacy actions comprise sending request notifications or legal notices to an entity associated with the privacy risk event, wherein the entity handles the personal data of the user, wherein the request notifications or legal notices comprise a request to change how the personal data of the user is handled.

22. The non-transitory computer readable medium of claim 20, wherein the privacy actions comprise presenting notifications to the user based at least in part on at least one of the first set of contextual data or the second set of contextual data.

23. The non-transitory computer readable medium of claim 22, wherein the notifications comprises at least one of an informative notification or a notification requiring an action from the user.

24. The non-transitory computer readable medium of claim 20, wherein the privacy actions comprise obtaining compensation for the user in exchange for allowing the entity to handle the personal data of the user.

25. The non-transitory computer readable medium of claim 20, wherein the instructions, when executed, cause the computing device to generate permission setting options based at least in part on at least one of the first set of contextual data or the second set of contextual data.

26. The non-transitory computer readable medium of claim 25, wherein the instructions, when executed, cause the computing device to transmit the permission setting options to a user computing device.

27. The non-transitory computer readable medium of claim 20, wherein the instructions, when executed, cause the computing device to:
determine a change in the first set of contextual data or the second set of contextual data; and
update the privacy action rules based at least in part on the change in the first set of contextual data or the second set of contextual data.

28. The non-transitory computer readable medium of claim 20, wherein the privacy action rules are stored in a database.

29. The non-transitory computer readable medium of claim 20, wherein the instructions, when executed, cause the computing device to receive the first set of contextual data and the second set of contextual data via a network.

30. The non-transitory computer readable medium of claim 20 wherein the privacy actions comprise:
sending a request notification to an entity that handles the personal data of the user, the request notification comprising a request for the entity to change its handling of the personal data of the user; and
issuing a complaint to the entity or a legal authority if a response to the request is not received within a time period designated by applicable laws.

31. The non-transitory computer readable medium of claim 20, wherein the privacy actions comprise:
sending a request notification to an entity that handles the personal data of the user, the request notification comprising a request for the entity to delete the personal data of the user; and
receiving a response notification from the entity, the response notification comprising confirmation of the deletion of the personal data of the user by the entity.

32. The non-transitory computer readable medium of claim 31, wherein the privacy actions further compromise:
generating an electronic communication to send to the user, the electronic communication comprising confirmation of the deletion by the entity of the personal data of the user; and
presenting the electronic communication to the user via a user computing device.

33. A data privacy and security management system for a networked device, the system comprising:
a privacy server configured to:
receive contextual data associated with at least one of the networked device, a module of the networked device, or a user of the networked device;
receive additional contextual data from at least one third-party Internet of Things (IoT) node, additional modules of the networked device, or entities related to the networked device, based on the contextual data;
receive privacy preference information of the user of the networked device, the privacy preference information being representative of user-specific permission settings that define preference of the user regarding handling of personal data of the user;
generate privacy action rules based on the privacy preference information, the contextual data, and the additional contextual data;
determine, using the contextual data and the additional contextual data, privacy risk events associated with at least one of the networked device, the module of the networked device, or the user; and
for each privacy risk event, execute one or more context based privacy actions based at least in part on the privacy action rules;
wherein the privacy server comprises a computer hardware device.

34. The system of claim 33, wherein at least one of the networked device and the module of the networked device are nodes of an IoT network, wherein the IoT network comprises two or more nodes.

35. The system of claim 34, wherein at least one of the networked device and the module of the networked device perform an action comprising one of accessing, collecting, storing and sharing the personal data of the user by interacting with at least one third-party IoT node via the IoT network.

36. The system of claim 35, wherein the at least one third-party IoT node comprises one of an IoT application, an IoT service and an IoT device.

37. The system of claim 33, wherein the privacy server is communicatively coupled to a user computing device and one or more privacy data sources via a network, wherein the one or more privacy data sources comprise:
- data registries that provide information for one or more of IoT nodes and attributes associated with each of the one or more IoT nodes.

38. The system of claim 37, wherein the attributes associated with each of the one or more IoT nodes comprises information about data collection and data usage practices for one of the IoT nodes and specific privacy settings available to the user.

39. The system of claim 37, wherein the one or more privacy data sources are further configured to:
- determine at least one third-party IoT node along a planned travel route of the networked device based on the contextual; and
- determine whether the at least one third-party IoT node collects and uses user personal data.

40. The system of claim 33, wherein a location of the networked device is utilized to identify at least one third-party IoT node at the location.

41. The system of claim 33, wherein the privacy server is further configured to:
- determine whether a newly identified third-party IoT node sells personal data to third parties; and
- allow the newly identified third-party IoT node to collect and temporarily store the personal data of the user if the newly identified third-party IoT node does not sell personal data to third parties.

42. The system of claim 33, wherein the context based privacy actions comprise sending one of request notifications and legal notices to an entity associated with the privacy risk event, wherein the entity handles the personal data of the user, wherein the request notifications and the legal notices comprise a request to change how the personal data of the user is handled.

43. The system of claim 33, wherein the privacy server is configured to:
- determine a change in at least one of the contextual data or the additional contextual data; and
- update the privacy action rules based at least in part on the change in the contextual data.

44. The system of claim 33, wherein the context based privacy actions comprise:
- sending a request notification to an entity that handles the personal data of the user, the request notification comprising a request for the entity to change its handling of the personal data of the user; and
- issuing a complaint to one of the entity and a legal authority if a response to the request is not received within a time period designated by applicable laws.

\* \* \* \* \*